United States Patent
Han et al.

(10) Patent No.: US 8,919,835 B1
(45) Date of Patent: Dec. 30, 2014

(54) STRUCTURE FOR ABSORBING FRONTAL COLLISION ENERGY OF VEHICLE

(71) Applicants: Hyundai Motor Company, Seoul (KR); Kia Motors Company, Seoul (KR)

(72) Inventors: Min Uke Han, Whasung-Si (KR); Kang San Lee, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/139,774

(22) Filed: Dec. 23, 2013

(30) Foreign Application Priority Data

Sep. 27, 2013 (KR) ................ 10-2013-0115596

(51) Int. Cl.
*B60R 19/34* (2006.01)
*B60R 19/18* (2006.01)

(52) U.S. Cl.
CPC ................................ *B60R 19/18* (2013.01)
USPC ..................... 293/133; 296/187.09

(58) Field of Classification Search
USPC ............ 293/132, 133, 134, 135; 296/187.03, 296/187.09, 203.02, 203.03
See application file for complete search history.

(56) References Cited

U.S. PATENT DOCUMENTS

| 2004/0183339 | A1* | 9/2004 | Seksaria et al. | 296/203.02 |
| 2004/0207234 | A1* | 10/2004 | Kim | 296/203.03 |
| 2012/0248820 | A1* | 10/2012 | Yasui et al. | 296/187.09 |
| 2014/0008924 | A1* | 1/2014 | Han et al. | 293/133 |
| 2014/0062106 | A1* | 3/2014 | Han, Min Uke | 293/133 |

FOREIGN PATENT DOCUMENTS

| JP | 4926018 B2 | 6/2009 |
| JP | 2009-248603 A | 10/2009 |
| KR | 10-2010-0060135 A | 6/2010 |

* cited by examiner

*Primary Examiner* — Lori L Lyjak
(74) *Attorney, Agent, or Firm* — Morgan, Lewis & Bockius LLP

(57) ABSTRACT

A structure for absorbing frontal collision energy of a vehicle absorbs frontal collision energy of a vehicle using both front side members configured to support a bumper beam disposed at a front side of a vehicle body, a shock absorber housing panel disposed outside the front side member, and a fender apron member disposed outside the shock absorber housing panel, and the structure includes: an enlarged member installed to be inclined between an outer surface of the front side member and a rear surface of the fender apron member so as to be spaced forward and apart from the outer surface of the front side member; and an enlarged frame engaged between a lower side of the fender apron member and a front mounting portion of a sub-frame.

12 Claims, 6 Drawing Sheets

STRUCTURE FOR ABSORBING FRONTAL COLLISION ENERGY OF VEHICLE

CROSS-REFERENCE TO RELATED APPLICATION

The present application claims priority of Korean Patent Application Number 10-2013-0115596 filed Sep. 27, 2013, the entire contents of which application is incorporated herein for all purposes by this reference.

BACKGROUND OF INVENTION

1. Field of Invention

The present invention relates to a structure for absorbing frontal collision energy of a vehicle, and more particularly, to a structure for absorbing frontal collision energy of a vehicle capable of efficiently dispersing and absorbing collision energy generated when the vehicle undergoes a frontal collision or a lateral collision at a front side thereof.

2. Description of Related Art

In general, a bumper assembly for a vehicle refers to a shock absorbing device that is installed at a front side and a rear side of a vehicle body so as to absorb impact to ensure safety for occupants and minimize deformation of the vehicle body when the vehicle collides with other vehicles or a stationary object.

In the bumper assembly, bumper beams, which are disposed at a front side and a rear side of a vehicle in a width direction of the vehicle, are mounted to side members of the vehicle body through both crash boxes, an impact absorber for absorbing impact force is installed at a front side of the bumper beam, and the bumper beams and the impact absorber are covered by a bumper cover.

The impact absorber, which is also referred to as an energy absorber, is correspondingly attached to a front surface of the bumper beam, and installed to be covered by the bumper cover.

However, in the case of the bumper assembly of the related art, which has been described above, an occupant cabin is deformed because collision energy between the side member, the crash box, and the bumper beam is not properly dispersed when the vehicle undergoes a small overlap (lateral) collision, and thereby, there is a problem in that the risk of injury to the occupants is increased.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a structure for absorbing frontal collision energy of a vehicle, which disperses and absorbs, in two directions, collision energy generated when the vehicle undergoes a frontal collision or a lateral collision at a front side thereof, such that collision energy to be transferred to a vehicle body is minimized by efficiently dispersing and absorbing the collision energy, thereby improving safety for vehicle occupants.

Various aspects of the present invention provide for a structure for absorbing frontal collision energy of a vehicle which absorbs frontal collision energy of a vehicle using both front side members configured to support a bumper beam disposed at a front side of a vehicle body, a shock absorber housing panel disposed outside the front side member, and a fender apron member disposed outside the shock absorber housing panel, the structure including: an enlarged member installed to be inclined between an outer surface of the front side member and a rear surface of the fender apron member so as to be spaced forward and apart from the outer surface of the front side member; and an enlarged frame engaged between a lower side of the fender apron member and a front mounting portion of a sub-frame.

In addition, a front end of the enlarged frame may be engaged by a bolt with the lower side of the fender apron member that corresponds to the enlarged member.

In addition, a front end of the enlarged member may be joined to the rear surface of the fender apron member, and a rear end of the enlarged member may be joined to the outer surface of the front side member.

In addition, the enlarged member may be formed as a tube.

In addition, the enlarged member may have welding flanges that are formed at edge portions of the enlarged member so as to be joined to the rear surface of the fender apron member and the outer surface of the front side member by a welding method.

In addition, the enlarged frame may be formed as a preformed tube.

Various aspects of the present invention provide for a structure for absorbing frontal collision energy of a vehicle which absorbs frontal collision energy of a vehicle using both front side members configured to support a bumper beam disposed at a front side of a vehicle body, a shock absorber housing panel disposed outside the front side member, and a fender apron member disposed outside the shock absorber housing panel, the structure including: an enlarged member disposed to be inclined between an outer surface of the front side member and a rear surface of the fender apron member so as to be spaced forward and apart from the outer surface of the front side member so that a front end of the enlarged member is joined to the rear surface of the fender apron member, and a rear end of the enlarged member is joined to the outer surface of the front side member; and an enlarged frame disposed between a lower side of the fender apron member and a front mounting portion of a sub-frame so that a front end of the enlarged frame is engaged by a bolt with the lower side of the fender apron member that correspond to the enlarged member, and a rear end of the enlarged frame is joined to the front mounting portion of the sub-frame.

In addition, the enlarged member may be formed as a tube.

In addition, the enlarged member may have welding flanges that are formed at edge portions of the enlarged member so as to be joined to the rear surface of the fender apron member and the outer surface of the front side member by a welding method.

In addition, the enlarged frame may be formed as a preformed tube.

Various aspects of the present invention provide for a structure for absorbing frontal collision energy of a vehicle which absorbs frontal collision energy of a vehicle using both front side members configured to support a bumper beam disposed at a front side of a vehicle body, a shock absorber housing panel disposed outside the front side member, and a fender apron member disposed outside the shock absorber housing panel, the structure including: an enlarged frame disposed between a lower side of the fender apron member and a front mounting portion of a sub-frame so that a front end of the enlarged frame is engaged by a bolt with the lower side of the fender apron member, and a rear end of the enlarged frame is joined to the front mounting portion of the sub-frame.

In addition, the enlarged frame may be formed as a preformed tube.

Various aspects of the present invention have an effect in that collision energy generated when the vehicle undergoes a frontal collision and a lateral collision at the front side of the vehicle is dispersed and absorbed in two directions, such that collision energy to be transferred to the vehicle body is minimized by efficiently dispersing and absorbing the collision energy, thereby improving safety for vehicle occupants.

In addition, since the enlarged member and the enlarged frame, which disperse collision energy forward and laterally from the front side of the vehicle and absorb collision energy, are applied, deformation of the vehicle body front side member may be minimized, thereby improving durability.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
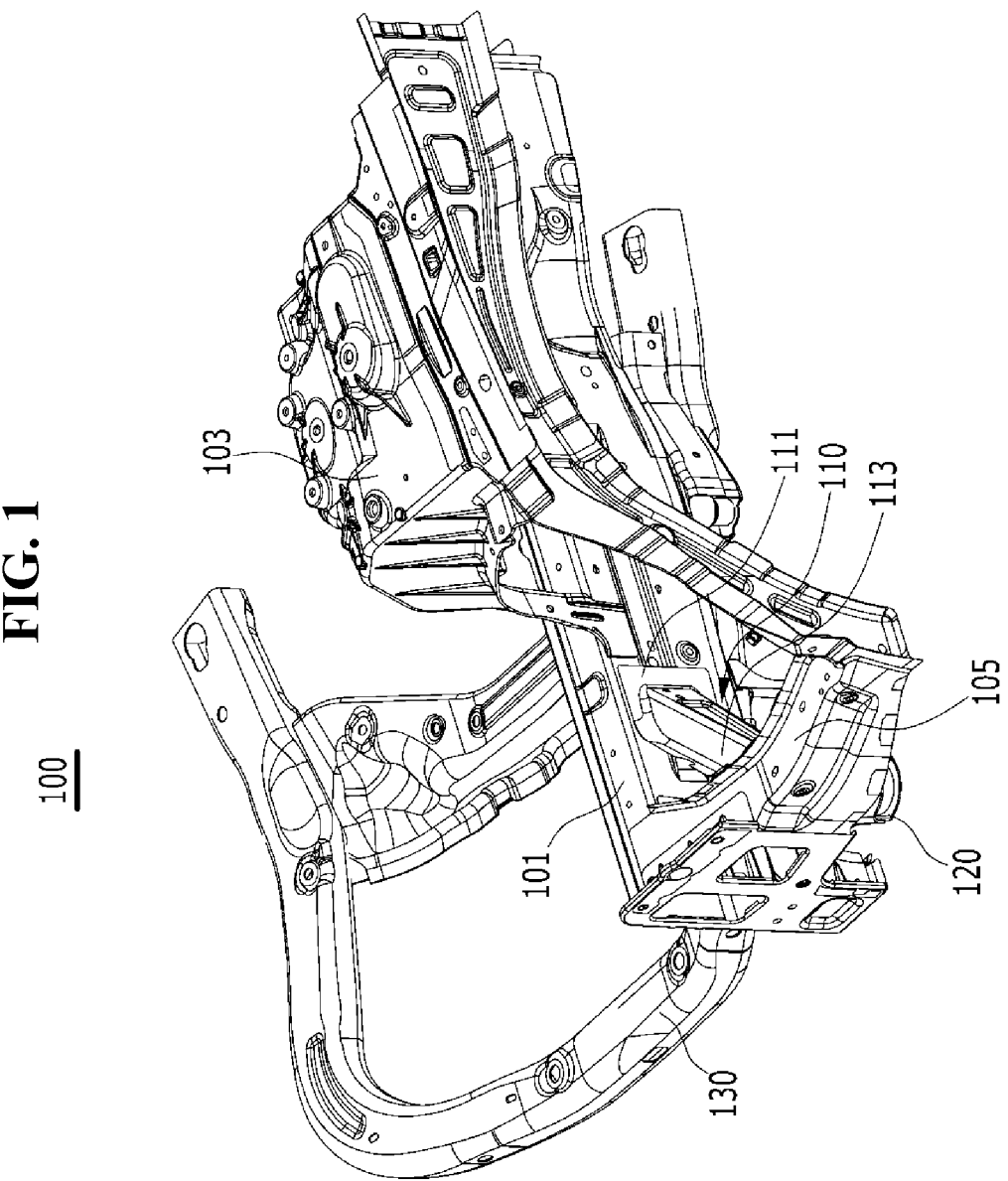
FIG. 1 is a front perspective view of an exemplary structure for absorbing frontal collision energy of a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The size and thickness of each component illustrated in the drawings are arbitrarily shown for understanding and ease of description, but the present invention is not limited thereto. Thicknesses are enlarged to clearly express various portions and areas.

In addition, a part irrelevant to the description will be omitted to clearly describe various embodiments of the present invention.

Figure 2:
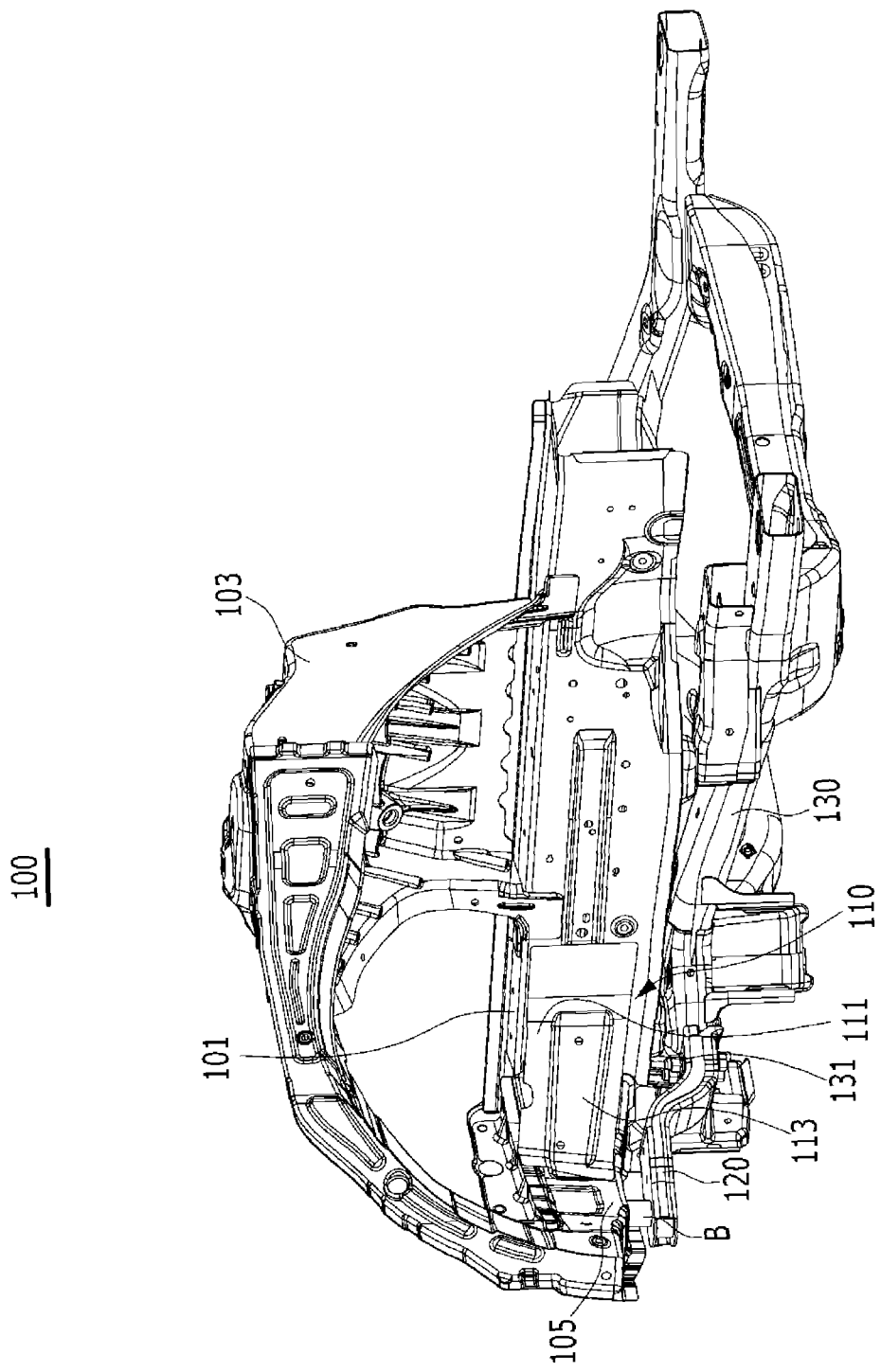
FIG. 2 is a rear perspective view of the exemplary structure for absorbing frontal collision energy of a vehicle according to the present invention.
Figure 3:
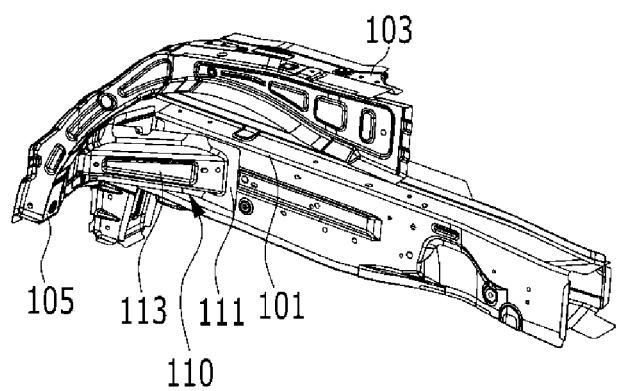
FIG. 3 is an exploded perspective view of the exemplary structure for absorbing frontal collision energy of a vehicle according to present invention.
Figure 3:
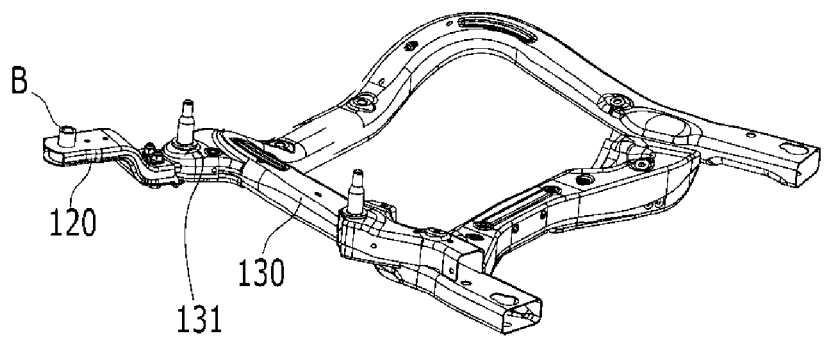

FIG. 1 is a front perspective view of a structure for absorbing frontal collision energy of a vehicle according to various embodiments of the present invention, FIG. 2 is a rear perspective view of the structure for absorbing frontal collision energy of a vehicle according to various embodiments of the present invention, and FIG. 3 is an exploded perspective view of the structure for absorbing frontal collision energy of a vehicle according to various embodiments of the present invention.

Referring to FIGS. 1 to 3, a structure 100 for absorbing frontal collision energy of a vehicle according to various embodiments of the present invention has a structure in which collision energy generated when the vehicle undergoes a front collision or a lateral collision at a front side of the vehicle may be efficiently dispersed and absorbed by both front side members 101 configured to support a bumper beam disposed at a front side of a vehicle body, a shock absorber housing panel 103 disposed outside the front side member 101, and a fender apron member 105 disposed outside the shock absorber housing panel 103.

To this end, the structure 100 for absorbing frontal collision energy of a vehicle according to various embodiments of the present invention includes an enlarged member 110, and an enlarged frame 120.

The enlarged member 110 is installed to be inclined between an outer surface of the front side member 101 and a rear surface of the fender apron member 105 so as to be spaced forward and apart from the outer surface of the front side member 101.

That is, a front end of the enlarged member 110 is joined to the rear surface of the fender apron member 105, and a rear end of the enlarged member 110 is joined to the outer surface of the front side member 101.

The enlarged member 110 has welding flanges 111 that are formed at edge portions of the enlarged member 110 so as to be joined to the rear surface of the fender apron member 105 and the outer surface of the front side member 101 by a welding method, and is formed as a tube having a space portion 113 therein.

The enlarged frame 120 is engaged between a lower side of the fender apron member 105 and a front mounting portion 131 of a sub-frame 130.

Here, a front end of the enlarged frame 120 is engaged by a bolt B with the lower side of the fender apron member 105 that corresponds to the enlarged member 110, a rear end of the enlarged frame 120 is joined to the front mounting portion 131 of the sub-frame 130, and the enlarged frame 120 is formed as a preformed tube.

Hereinafter, a process of dispersing and absorbing collision energy using the structure 100 for absorbing frontal collision energy of a vehicle according to various embodiments of the present invention, which is configured as described above, will be described with reference to FIG. 4.

Figure 4:
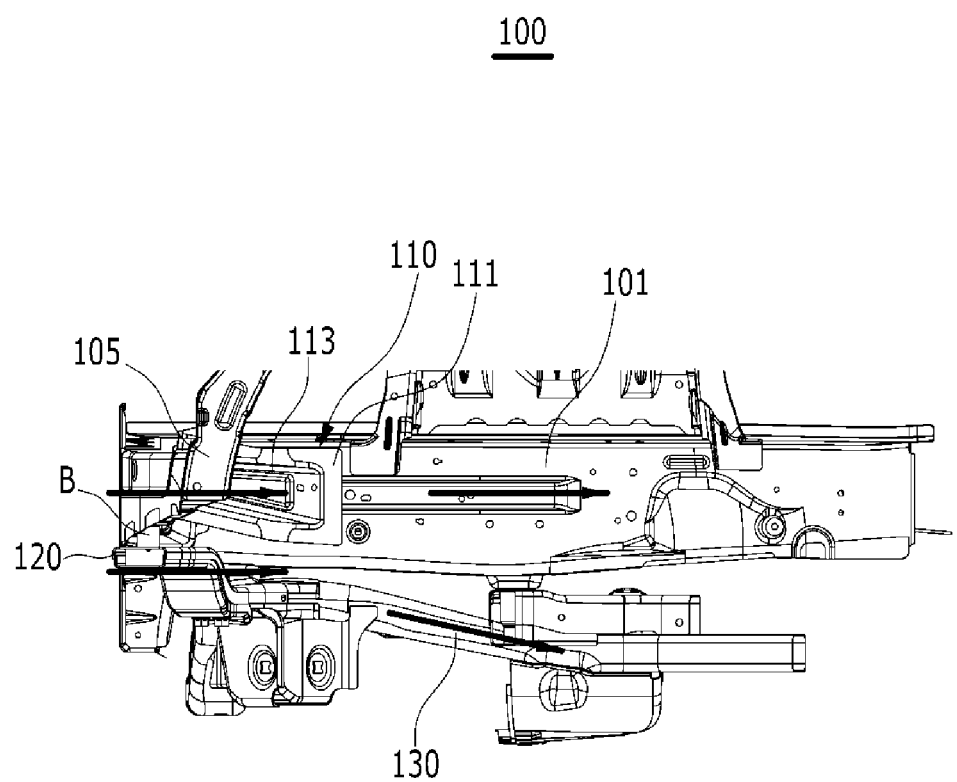
FIG. 4 is a structural view illustrating collision energy dispersion in the exemplary structure for absorbing frontal collision energy of a vehicle according to the present invention.

FIG. 4 is a structural view illustrating collision energy dispersion in the structure for absorbing frontal collision energy of a vehicle according to various embodiments of the present invention.

Referring to FIG. 4, according to the structure 100 for absorbing frontal collision energy of a vehicle according to various embodiments of the present invention, when the vehicle undergoes a lateral (small overlap) collision at the front side of the vehicle, the fender apron member 105 comes into contact with a barrier, and collision energy caused by the collision between the fender apron member 105 and the barrier is transferred to the enlarged member 110 of which the front end is joined to the rear surface of the fender apron member 105.

Further, the collision energy transferred to the enlarged member 110 is again transferred to the front side member 101 that is joined to the rear end of the enlarged member 110.

Simultaneously, when the vehicle undergoes a lateral (small overlap) collision at the front side of the vehicle, collision energy is also transferred to the enlarged frame 120 of which the front end is engaged by the bolt B with the lower side of the fender apron member 105.

Further, the collision energy transferred from the front end of the enlarged frame 120 is again transferred to the sub-frame 130 that is joined to the rear end of the enlarged frame 120.

That is, when the vehicle undergoes a lateral (small overlap) collision, the structure 100 for absorbing collision energy of a vehicle according to various embodiments of the present invention disperses and absorbs collision energy in two directions using the enlarged member 110 and the enlarged frame 120, thereby minimizing an amount of collision energy to be transferred to an occupant cabin, and improving rigidity of the vehicle body.

Therefore, the structure 100 for absorbing frontal collision energy of a vehicle according to various embodiments of the present invention disperses and absorbs collision energy generated when the vehicle undergoes a frontal collision and a lateral collision at the front side of the vehicle, in two directions using the enlarged member 110 and the enlarged frame 120, such that collision energy to be transferred to the vehicle body is minimized by efficiently dispersing and absorbing the collision energy, thereby improving safety for vehicle occupants.

In addition, since the enlarged member 110 and the enlarged frame 120, which disperse collision energy forward and laterally from the front side of the vehicle and absorb collision energy, are applied, deformation of the vehicle body front side member 101 may be minimized, thereby improving durability.

Figure 5:
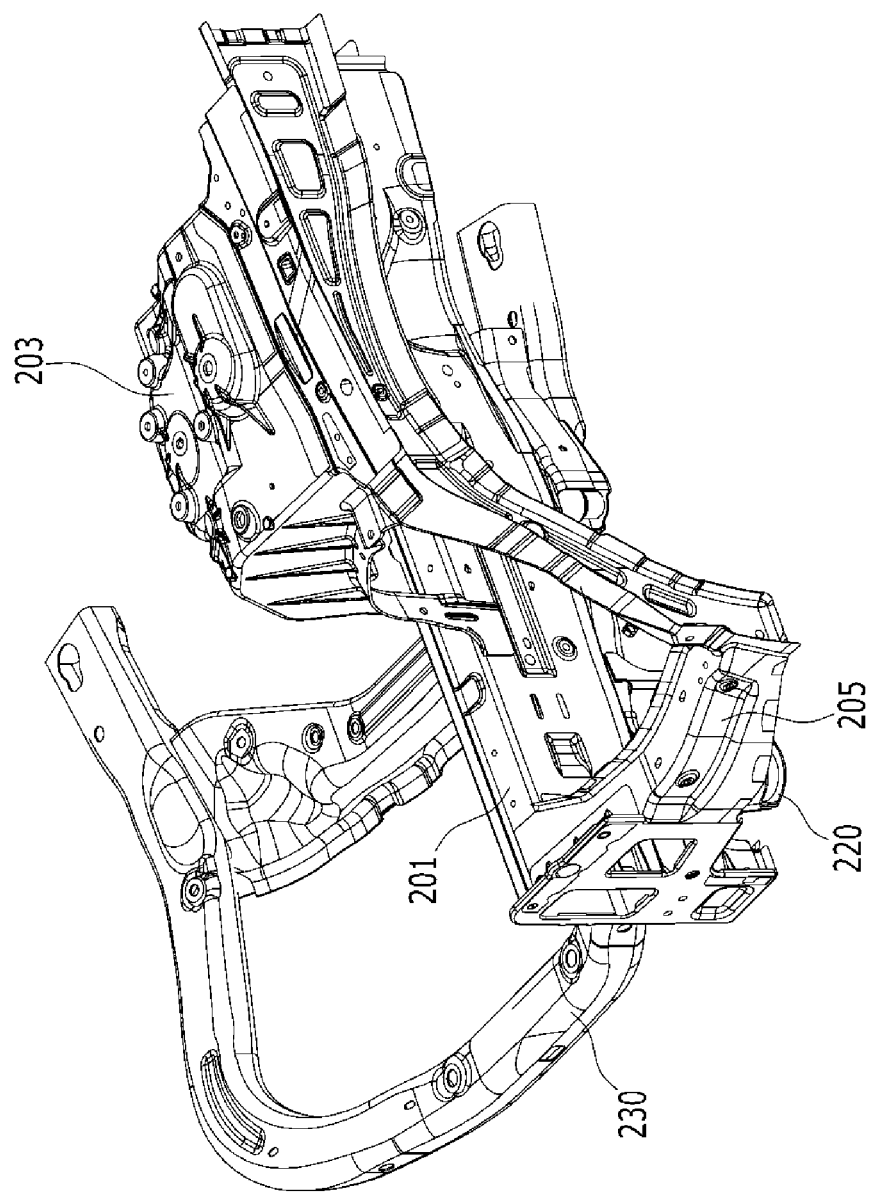
FIG. 5 is a front perspective view of an exemplary structure for absorbing frontal collision energy of a vehicle according to the present invention.
Figure 6:
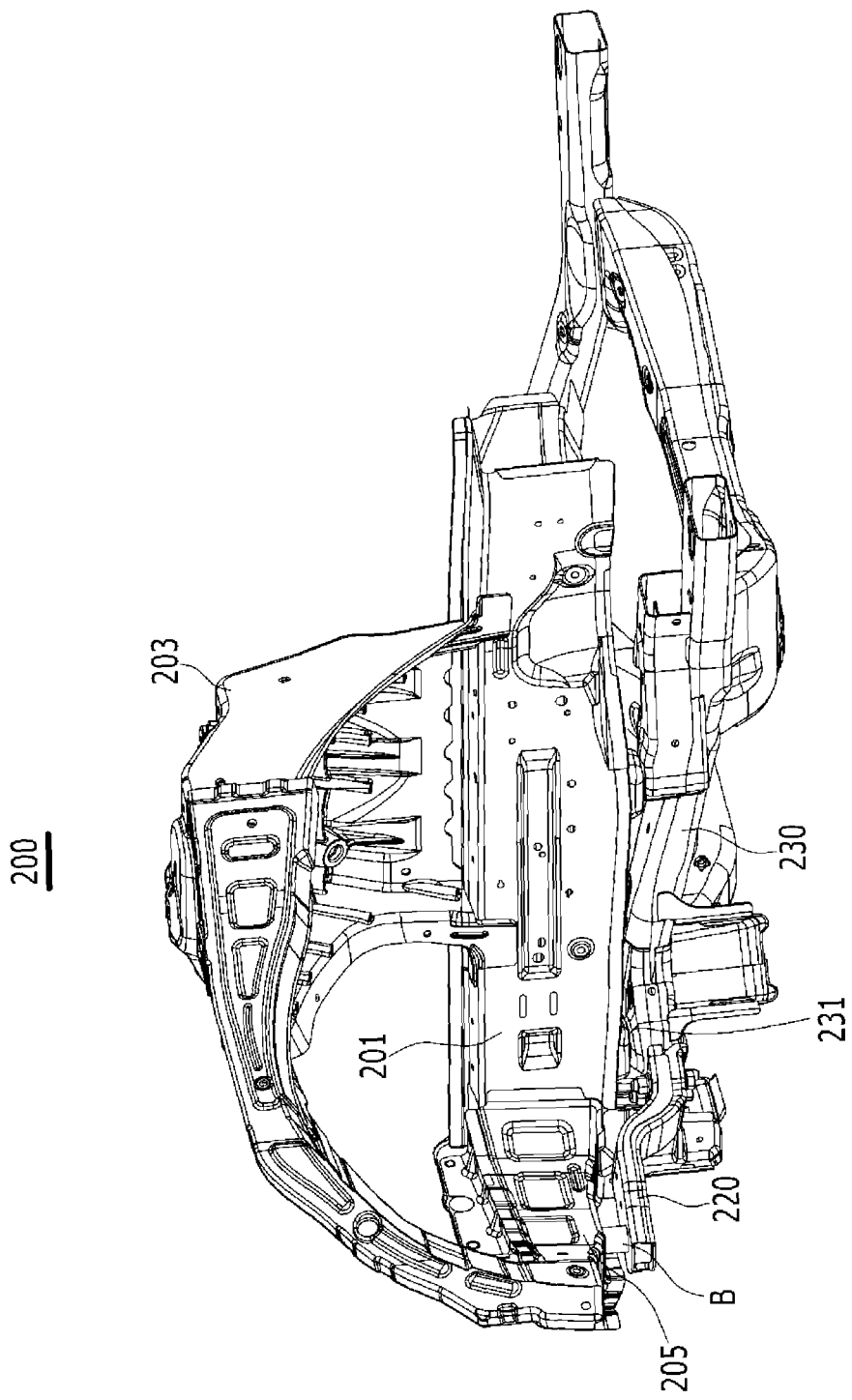
FIG. 6 is a rear perspective view of the exemplary structure for absorbing frontal collision energy of FIG. 5.

FIG. 5 is a front perspective view of a structure for absorbing frontal collision energy of a vehicle according to various embodiments of the present invention, and FIG. 6 is a rear perspective view of the structure for absorbing frontal collision energy of a vehicle according to various embodiments of the present invention.

Referring to FIGS. 5 and 6, a structure 200 for absorbing frontal collision energy of a vehicle according to various embodiments of the present invention has a structure in which collision energy generated when the vehicle undergoes a front collision or a lateral collision at a front side of the vehicle may be efficiently dispersed and absorbed by both front side members 201 configured to support a bumper beam disposed at a front side of a vehicle body, a shock absorber housing panel 203 disposed outside the front side member 201, and a fender apron member 205 disposed outside the shock absorber housing panel 203.

To this end, the structure 200 for absorbing frontal collision energy of a vehicle according to various embodiments of the present invention includes an enlarged frame 220.

The enlarged frame 220 is disposed between a lower side of the fender apron member 205 and a front mounting portion 231 of a sub-frame 230, a front end of the enlarged frame 220 is engaged by a bolt B with the lower side of the fender apron member 205, a rear end of the enlarged frame 220 is joined to the front mounting portion 231 of the sub-frame 230, and the enlarged frame 220 is formed as a preformed tube.

Hereinafter, an operation of the structure for absorbing frontal collision energy of a vehicle according to various embodiments of the present invention, which has the aforementioned configuration, will be described with reference to FIGS. 5 and 6.

Referring to a process of dispersing and absorbing collision energy using the structure 200 for absorbing frontal collision energy of a vehicle according to various embodiments of the present invention, when the vehicle undergoes a lateral (small overlap) collision at the front side of the vehicle, the fender apron member 205 comes into contact with a barrier, and collision energy caused by the collision between the fender apron member 205 and the barrier is transferred to the enlarged frame 220 of which the front end is engaged by the bolt B with the lower side of the fender apron member 205.

Further, the collision energy transferred from the front end of the enlarged frame 220 is again transferred to the sub-frame 230 that is joined to the rear end of the enlarged frame 220.

That is, when the vehicle undergoes a lateral (small overlap) collision, the structure 200 for absorbing collision energy of a vehicle according to various embodiments of the present invention disperses and absorbs collision energy using the enlarged frame 220, thereby minimizing an amount of collision energy to be transferred to an occupant cabin, and improving rigidity of the vehicle body.

Here, unlike the structure 100 for absorbing collision energy of a vehicle of FIG. 1, in the structure 200 for absorbing collision energy of a vehicle of FIG. 5, the enlarged member 110 is eliminated, but operations and effects concerning the collision energy generated when the vehicle undergoes a frontal collision and a lateral collision are the same.

Therefore, the structure 200 for absorbing frontal collision energy of a vehicle according to various embodiments of the present invention disperses and absorbs collision energy generated when the vehicle undergoes a frontal collision and a lateral collision at the front side of the vehicle using the enlarged frame 220, such that collision energy to be transferred to the vehicle body is minimized by efficiently dispersing and absorbing the collision energy, thereby improving safety for vehicle occupants.

In addition, since the enlarged frame 220, which disperses collision energy forward and laterally from the front side of the vehicle and absorbs collision energy, is applied, deformation of the vehicle body front side member 201 may be minimized, thereby improving durability.

For convenience in explanation and accurate definition in the appended claims, the terms lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for absorbing frontal collision energy of a vehicle comprising:
 a front side member configured to support one side of bumper beam disposed at a front side of a vehicle body;
 a shock absorber housing panel disposed outside the front side member;

a fender apron member spaced from the shock absorber housing panel;

an enlarged member installed at an angle between an outer surface of the front side member and a rear surface of the fender apron member extending forward and away from the outer surface of the front side member; and an enlarged frame engaged between a lower side of the fender apron member and a front mounting portion of a sub-frame.

2. The structure of claim 1, wherein a front end of the enlarged frame is engaged by a bolt with the lower side of the fender apron member that corresponds to the enlarged member.

3. The structure of claim 1, wherein a front end of the enlarged member is joined to the rear surface of the fender apron member, and a rear end of the enlarged member is joined to the outer surface of the front side member.

4. The structure of claim 1, wherein the enlarged member is tubular.

5. The structure of claim 1, wherein the enlarged member includes welding flanges that are formed at edge portions of the enlarged member so as to be joined to the rear surface of the fender apron member and the outer surface of the front side member by a welding method.

6. The structure of claim 1, wherein the enlarged frame is formed as a preformed tube.

7. A structure for absorbing frontal collision energy of a vehicle comprising:

a front side member configured to support one end of a bumper beam disposed at a front side of a vehicle body;

a shock absorber housing panel disposed outside the front side member;

a fender apron member disposed outside the shock absorber housing panel;

an enlarged member disposed at an angle between an outer surface of the front side member and a rear surface of the fender apron member and extending forward and away from the outer surface of the front side member so that a front end of the enlarged member is joined to the rear surface of the fender apron member, and a rear end of the enlarged member is joined to the outer surface of the front side member; and an enlarged frame disposed between a lower side of the fender apron member and a front mounting portion of a sub-frame so that a front end of the enlarged frame is engaged by a bolt with the lower side of the fender apron member that correspond to the enlarged member, and a rear end of the enlarged frame is joined to the front mounting portion of the sub-frame.

8. The structure of claim 7, wherein the enlarged member is tubular.

9. The structure of claim 7, wherein the enlarged member includes welding flanges that are formed at edge portions of the enlarged member so as to be joined to the rear surface of the fender apron member and the outer surface of the front side member by a welding method.

10. The structure of claim 8, wherein the enlarged frame is formed as a preformed tube.

11. A structure for absorbing frontal collision energy of a vehicle comprising:

a front side member configured to support one end of a bumper beam disposed at a front side of a vehicle body;

a shock absorber housing panel disposed outside the front side member;

a fender apron member disposed outside the shock absorber housing panel;

an enlarged frame disposed between a lower side of the fender apron member and a front mounting portion of a sub-frame so that a front end of the enlarged frame is engaged by a bolt with the lower side of the fender apron member, and a rear end of the enlarged frame is joined to the front mounting portion of the sub-frame.

12. The structure of claim 11, wherein the enlarged frame is formed as a preformed tube.

\* \* \* \* \*